A. C. MILBRATH.
CAMERA.
APPLICATION FILED JAN. 13, 1916.
1,286,708. Patented Dec. 3, 1918.
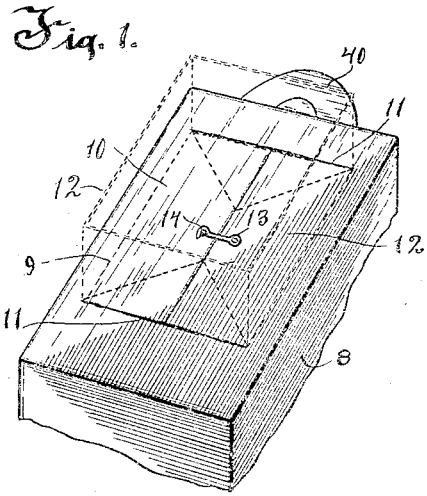
Fig. 1.
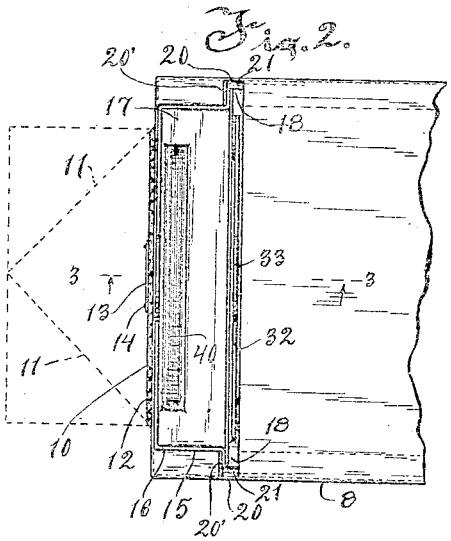
Fig. 2.
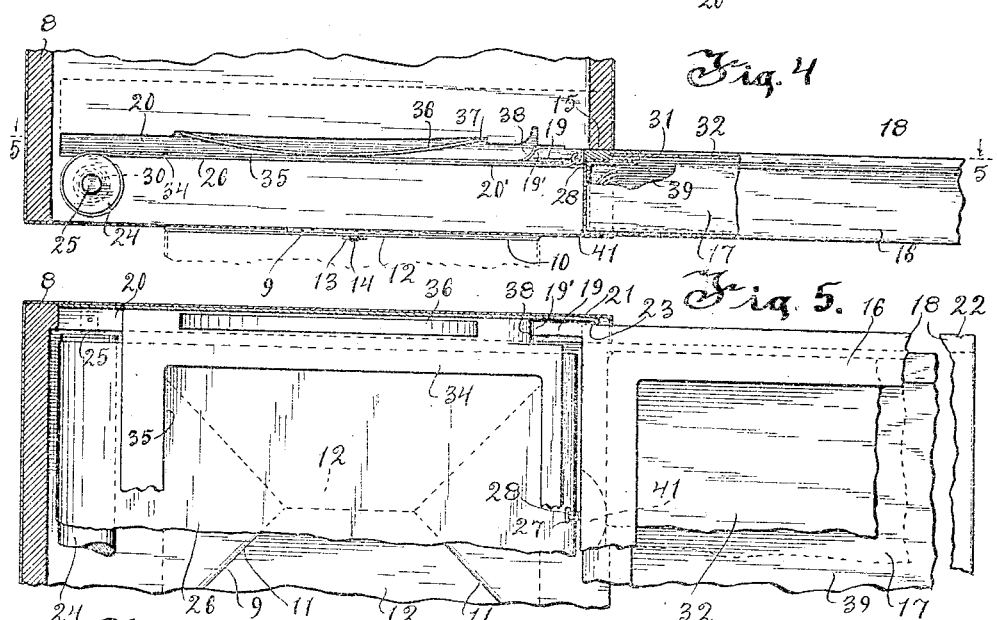
Fig. 4.
Fig. 5.
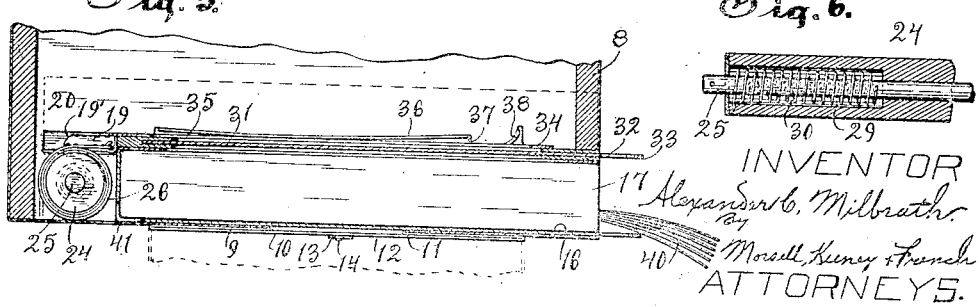
Fig. 3.
Fig. 6.
INVENTOR
Alexander C. Milbrath.
By
Morsell, Kenney & French
ATTORNEYS.
THE NORRIS PETERS CO., PHOTO-LITHO., WASHINGTON, D. C.

UNITED STATES PATENT OFFICE.

ALEXANDER C. MILBRATH, OF MILWAUKEE, WISCONSIN.

CAMERA.

1,286,708.     Specification of Letters Patent.     Patented Dec. 3, 1918.

Application filed January 13, 1916. Serial No. 71,811.

*To all whom it may concern:*

Be it known that I, ALEXANDER C. MIL-BRATH, a citizen of the United States, and resident of Milwaukee, in the county of Milwaukee and State of Wisconsin, have invented new and useful Improvements in Cameras, of which the following is a description, reference being had to the accompanying drawings, which are a part of this specification.

This invention relates to improvements in cameras and more particularly to the focusing means in a film pack type camera.

In the ordinary film pack cameras if it is desired to properly focus the object being photographed it is necessary to remove the film pack and its casing from the camera and insert a ground glass therein and when the object is properly focused the ground glass is removed and the film pack and its casing is reinserted in position and the negative is exposed in the ordinary manner. These different changes and adjustments require considerable time and preclude the possibility of focusing the camera on moving objects. A further objectionable feature is the separate parts which it is necessary to carry and which are liable to become misplaced or lost.

It is one of the objects of the present invention to overcome the before mentioned objectionable features and provide an improved camera which will contain both a focusing screen and a film pack either one of which may be used without removing the other from the camera.

A further object of the invention is to provide a camera with a focusing screen formed of a flexible translucent material which is mounted on a roller and is adapted to be unrolled to operative position when the film pack is partly withdrawn from the camera.

A further object of the invention is to provide a camera having means for positioning the screen when unrolled, in the same plane as the forward film in the film pack.

A further object of the invention is to provide a camera provided with novel means for eliminating the use of a screen cloth.

A further object of the invention is to provide a camera which may be easily loaded and unloaded with film packs when desired.

A further object of the invention is to provide a camera which is of simple construction, is strong and durable and is well adapted for the purpose described.

With the above and other objects in view the invention consists of the improved camera and its parts and combinations as set forth in the claims, and all equivalents thereof.

In the accompanying drawing in which the same reference characters indicate the same parts in all of the views:

Figure 1 is a perspective view of the rear portion of a film pack camera provided with the improved features, the view also indicating by dotted lines a screen hood shown in extended position;

Fig. 2 is a top view of the portion of the camera shown in Fig. 1;

Fig. 3 is a longitudinal part sectional view taken on line 3—3 of Fig. 2;

Fig. 4 is a sectional view similar to Fig. 3 with the film pack casing drawn outwardly;

Fig. 5 is a transverse sectional view taken on line 5—5 of Fig. 4; and

Fig. 6 is a sectional detail view of one end portion of the screen roller.

Referring to the drawing the numeral 8 indicates the rear portion of the improved camera casing of the film pack type which is provided with a screen opening 9 closed by the combined flap door and screen hood 10.

The combined flap door and hood is formed of a flexible material which is creased at its opposite end portions 11 to permit the said end portions 11 and side portions 12 to be bent outwardly at right angles from the casing to open the door and to protect the focusing screen from side lights. A hook 13 pivoted to one portion of the door is adapted to hook over a pin 14 projecting from another portion of the door to hold said door in closed position.

One end portion of the camera casing is provided with an elongated pack casing opening 15 to receive the film pack casing 16 slidably mounted therein. This casing is open at one end to receive the ordinary film pack 17 which is operated in the ordinary manner. The film pack casing 16 is of rectangular form and is provided with opposite side edge flanges 18, Figs. 1 and 5, having inner end guide extensions 19 projecting therefrom. The camera casing is provided with grooved portions 20 to accommodate the opposite side edge flanges 18 and also to accommodate spring dogs 21 which engage notches 22 and stop shoulders 23 formed on the edge flanges 18. The engagement of the dogs with the notches serve to yieldingly hold the film pack casing in closed position while the stop shoulders prevent the entire withdrawal of the pack casing from the camera.

A spring retrieved roller 24 journaled on a rod 25 which is mounted fast in the camera casing at the opposite end to the pack casing opening 15 has wound therearound a sheet of flexible translucent material 26 such as celluloid, and which material serves as a focusing screen for the camera when unrolled and in front of the screen opening 9, Fig. 4.

One end of the screen material is fastened to the roller and the opposite end is provided with an opening 27 through which extends a hook 28 projecting from the inner end of the pack casing.

The roller at one end has an enlarged bore portion 29 to accommodate a coiled spring 30 mounted on the rod 25. One end of the spring is secured to the roller and the other end to the rod so that the spring will automatically wind the screen on the roller when the pack casing is pushed inwardly. The frictional engagement between the pack casing and the camera casing is sufficient to hold the pack casing in any position against the pull of the roller spring.

The pack casing is provided with a front opening 31, Fig. 3, closed by a slide 32 to permit the exposure of the film when within the camera casing and also to protect the films from light when the pack casing is partly withdrawn from the camera casing. A projecting tab 33 is provided for convenience in withdrawing the slide.

In order to properly position the focusing screen in the same plane as the outermost film the camera casing in front of the pack casing is provided with a rectangular positioning frame 34 the opening 35 of which corresponds to the opening in the film pack casing. This rectangular frame is held yieldingly against the pack casing by flat springs 36 mounted in recesses 37 formed in the camera casing. The springs engage the front face of the frame on opposite sides of the opening thereof so that when the pack casing is withdrawn the frame will be pressed rearwardly to aline the screen with the front film. The movement of the frame rearwardly is limited by the rear walls 20' of the grooved portion 20 of the camera casing.

The upper side portions of the rectangular frame 34 are provided with upwardly and forwardly curved projections 38, Figs. 4 and 5, which are engaged by the inner beveled ends 19' of the guide extensions 19 when the pack casing is pushed into the camera casing.

The films 39 of the film pack are provided with projecting tabs 40 and are pulled into position in the ordinary manner and the pack casing is provided with an opening 41 for convenience in removing the used film pack.

In use when it is desired to focus the object being photographed the pack casing is pulled outwardly to the limit of its movement and the combined door and screen hood is opened. The object will appear on the translucent screen in the usual manner. When properly focused the door is closed and the pack casing is pushed into the casing and the pack casing slide is pulled outwardly to open position. The proper exposure may now be made in the usual manner.

From the foregoing description it will be seen that the invention is of very simple construction and is well adapted for the purpose described.

What I claim as my invention is:

1. A camera, comprising in part a casing having a film pack casing space therein, a film pack casing mounted therein, and a flexible focusing screen mounted in the casing and connected to and movable with the film pack casing to a focusing position when the film pack casing is partly withdrawn from the camera casing.

2. A camera, comprising in part a casing having a film pack casing space and a focusing opening, a film pack casing positioned in said space, and a flexible focusing screen mounted in the casing and connected to and movable with the film to a focusing position in front of the focusing opening when the film pack casing is partly withdrawn from the camera casing.

3. A camera, comprising in part a casing having a space and a focusing opening, a film pack slidably positioned in said space, and a flexible focusing screen mounted in the casing and connected to the film pack and normally in non-focusing position but automatically movable to a focusing position in front of the focusing opening when the film pack is partly withdrawn from the camera.

4. A camera, comprising in part a casing having a space and a focusing opening, a sensitive to light material holder slidably positioned in said space, a roller mounted in the casing, a flexible focusing screen wound on the roller and having one end portion connected to and automatically movable with the sensitive material holder to a focusing position in front of the focusing opening when the sensitive material holder is partly withdrawn from the casing, and means for winding the flexible material on the roller.

5. A camera, comprising in part a casing having a space and a focusing opening, a sensitive to light material holder slidably positioned in said space, a roller mounted in the casing, a flexible focusing screen wound on the roller and having one end portion connected to and automatically movable with the sensitive piece of material holder to a focusing position in front of the focusing opening when the sensitive material holder is partly withdrawn from the casing, and a coiled spring means for automatically winding the flexible material on the roller.

6. A camera, comprising in part a casing having a film pack space casing and a focusing opening, a pack casing slidably mounted in the said space and having a front opening, a slide for said front opening, a spring retrieved roller mounted in the camera, and a flexible focusing screen wound on the roller and having one end portion connected to said roller and the other end portion connected to the pack casing and movable therewith to a focusing position in front of the focusing opening when the pack casing is partly withdrawn from the camera casing.

7. A camera, comprising in part a casing having a film pack casing space and a focusing opening, a film pack casing slidably mounted in the said space and having a front opening, a slide for said front opening, a spring retrieved roller mounted in the camera, a flexible focusing screen wound on the roller and having one end portion connected to said roller and the other end portion connected to the pack casing and movable therewith to a focusing position in front of the focusing opening when the pack casing is partly withdrawn from the camera casing, and means for alining the focusing screen in the same plane as the front film of the film pack.

8. A camera, comprising in part a casing having a film pack casing space and a focusing opening, a film pack casing slidably mounted in the said space and having a front opening, a slide for said front opening, a spring retrieved roller mounted in the camera, a flexible focusing screen wound on the roller and having one end portion connected to said roller and the other end portion connected to the pack casing and movable therewith to a focusing position in front of the focusing opening when the pack casing is partly withdrawn from the camera casing, and a frame positioned in front of the pack casing and engaging the focusing screen when said pack casing is partly withdrawn from the camera casing and a yielding means engaging the frame to aline the screen in the same plane as the front film of the film pack.

9. A camera, comprising in part a casing having a film pack casing space and a focusing opening, a combined door and focusing hood closing the focusing opening, a pack casing slidably mounted in the camera casing and having a front opening, a slide for said front opening, a film pack mounted in the pack casing, a spring retrieved roller mounted in the camera, a flexible focusing screen wound on the roller and having one end portion connected to said roller and the other end portion connected to the pack casing and movable therewith to a focusing position in front of the focusing opening when the pack casing is partly withdrawn from the camera casing, and means for alining the focusing screen in the same plane as the front film of the film pack.

10. A camera, comprising in part a casing having a film pack casing space and a focusing opening, a film pack casing slidably mounted in the camera casing and having a front opening and inwardly extending beveled portions, a slide for said front opening, a spring retrieved roller mounted in the camera, a flexible focusing screen wound on the roller and having one end portion connected to said roller and the other end portion connected to the pack casing and movable therewith to a focusing position in front of the focusing opening when the pack casing is partly withdrawn from the camera casing, and a frame positioned in front of the pack casing and engaging the focusing screen when said pack casing is partly withdrawn from the camera casing and a yielding means engaging the frame to aline the screen in the same plane as the front film of the film pack, said frame having projecting portions which are engaged by the beveled portions of the pack casing to force said frame away from the screen when the pack casing is pushed inwardly.

11. A camera, comprising in part a casing having a film pack space and a focusing opening, a combined door and focusing hood closing the focusing opening, a pack casing slidably mounted in the camera casing and having a front opening and inwardly extending beveled portions, a slide for said front opening, a film pack mounted in the pack casing, a spring retrieved roller mounted in the camera, a flexible focusing screen wound on the roller and having one end portion connected to said roller and the other end portion connected to the pack casing and movable therewith to a focusing position in front of the focusing opening when the pack casing is partly withdrawn from the camera casing, a frame positioned in front of the pack casing and engaging the focusing screen when said pack casing is partly withdrawn from the camera casing, and a yielding means engaging the frame to aline the screen in the same plane as the front film of the film pack, said frame having projecting portions which are engaged by the beveled portions of the pack casing to force said frame away from the screen when the pack casing is pushed inwardly.

12. In a camera, a section carrying a flexible focusing screen, a sensitized material holder section movably connected thereto to carry the sensitized material into and out of exposure position, said focusing screen having one end attached to the holder section.

13. In a camera, a section carrying a flexible focusing screen, said screen mounted on a self-winding roller, a sensitized material holder section movably connected to the first mentioned section to carry the film into and out of exposure position, said focusing screen having its free end attached to the holder section.

In testimony whereof, I affix my signature.

ALEXANDER C. MILBRATH.

Copies of this patent may be obtained for five cents each, by addressing the "Commissioner of Patents, Washington, D. C."